United States Patent Office 3,327,016
Patented June 20, 1967

3,327,016
EPOXIDE COMPOSITIONS CURED WITH 1,4-BIS (AMINOMETHYL) CYCLOHEXANE
Henry L. Lee, Jr., San Marino, Calif., assignor to The Epoxylite Corporation, El Monte, Calif., a corporation of California
No Drawing. Filed July 9, 1964, Ser. No. 381,925
38 Claims. (Cl. 260—830)

ABSTRACT OF THE DISCLOSURE

Cured products from polyepoxides and the usual curing agents tend to yellow during curing or discolor after curing upon exposure to ultraviolet radiation. The use of a specific curing agent, 1,4-bis (aminomethyl) cyclohexane, to cure glycidyl ether polyepoxides provides a cured product resistant to discoloration by ultraviolet radiation. By the selection of very specific compounds, a very superior cured product is obtained which is particularly suitable for the manufacture of dental prosthetic devices, e.g., false teeth.

---

This invention is a continuation-in-part of application Ser. No. 339,109, filed Jan. 21, 1964, now abandoned.

This invention relates to curable polyepoxide compositions, to the cured products obtained therefrom and to methods for producing cured polyepoxide products resistant to moisture pickup and discoloration upon exposure to ultraviolet radiation. In particular, the invention relates to curable compositions comprising a glycidyl polyether and sufficient amounts of 1,4-bis (aminomethyl) cyclohexane to cure said composition to a solid, insoluble product; to solid cured products prepared from such compositions and to a method for producing transparent, solid cured polyepoxide products resistant to discoloration when exposed to ultraviolet radiation by using 1,4-bis (aminomethyl) cyclohexane as the curing agent.

Recently polyepoxides that are clear or of light color have become commercially available. The availability of these polyepoxides together with the increasing availability of clearer curing agents has led to suggestions of the use of cured polyepoxide products in many applications where clarity is important. Cured polyepoxide products possess a number of advantages over other art-known clear casting resins such as those based on methyl methacrylate, unsaturated polyesters and allyl diglycol carbonate and the like. The polyepoxide materials cure with less shrinkage, develop a much higher degree of adhesion to adjacent surfaces as they cure, and provide cured products generally having higher mechanical strength, higher impact resistance, higher abrasion resistance and greater dimensional stability and resistance to moisture and chemicals over a wider temperature range.

Unfortunately, prior experience has shown that cured products prepared from polyepoxides and the usual curing agents become yellow during the curing reaction or, if clear upon completion of the curing reaction, discolor when exposed to ultraviolet radiation, e.g., when exposed to sunlight. Table I below summarizes results obtained upon curing a typical commercially available diglycidyl ether of Bisphenol A with various typical curing agents.

TABLE I.—CURING OF DIGLYCIDYL ETHER OF BISPHENOL A WITH TYPICAL CURING AGENTS

| | |
|---|---|
| 1. Meta xylylene-diamine | Cured clear but darkened under UV.[1] |
| 2. Diethylene triamine | Do.[1] |
| 3. Diethanolamine | Do.[1] |
| 4. N-(2-hydroxy propyl) ethylenediamine (Monolene). | Do.[1] |
| 5. Dimethylaminopropylamine | Do.[1] |
| 6. t-Butyldiethanolamine | Yellowed during cure. |
| 7. 3,3' (methylimino) propylamine | Do. |
| 8. N-hydroxyethyl piperazine | Do. |
| 9. Benzyltrimethyl ammonium chloride. | Do. |
| 10. 3,5-dimethyl morpholine | Do. |
| 11. Cyclohexyl amine | Do. |
| 12. 2,3,5,6, tetramethyl piperazine | Do. |
| 13. N-isopropyl-2-methyl-1,2 propane diamine. | Cured clear but yellowed under UV.[1] |
| 14. Benzyldimethyl amine | Do.[1] |
| 15. 1,4-Bis(2-hydroxy-propyl)-2-methyl piperazine. | Yellowed during cure. |
| 16. Pyromellitic dianhydride | Do. |
| 17. 2,3,5,6 Tetrachloro-p-xylylene-a,a' diamine. | Do. |

[1] UV=Ultraviolet radiation in accordance with ASTM 620-57T.

It would, of course, be highly desirable to have transparent, clear cured polyepoxides that are resistant to discoloration upon exposure to ultraviolet radiation. Such cured products and compositions for preparing the same would be eminently suited for use as, for example, aircraft and missile glazing, adhesives, and as casting resins for making dental products such as jacket crowns, dentures, et cetera, or other products such as toys, buttons, brush handles, and numerous other like articles.

The dental industry, in particular, demands much of epoxy resins. Major holdups from using epoxy resins in a dental environment appear to be lack of UV resistance and lack of moisture build-up resistance. A surprisingly large amount of sunlight penetrates the oral cavity and unless the prosthetic device is UV stable, it will yellow, darken, or opacify sufficiently that the original aesthetics are lost. Furthermore, since the prosthetic device will be constantly in contact with moisture, an acceptable prosthetic device additionally demands superior resistance to moisture pickup by the resin.

It is a general object of this invention to provide compositions and methods for solving the prior art problems noted above.

A specific object of the invention is to provide curable glycidyl polyether compositions from which solid cured products resistant to discoloration upon exposure to ultraviolet radiation can be produced.

Another specific object of the invention is to provide transparent solid cured glycidyl polyether products.

Another object of this invention is to provide a method for producing solid cured glycidyl polyether products that are resistant to discoloration when exposed to ultraviolet radiation.

Still another object of this invention is to provide suitable UV and moisture resistant solid cured epoxy resins for use as casting resins for dental prosthetic devices.

Still further objects and the many advantages of the invention will become apparent in view of the following more detailed description.

This invention is based upon the discovery that the use of 1,4-bis (aminomethyl) cyclohexane as a curing agent for glycidyl polyethers provides cured solid products resistant to discoloration upon exposure to ultraviolet radiation.

It has further been discovered that the stability of 1,4-bis (aminomethyl) cyclohexane is markedly increased by forming an adduct of this amine by from about 2 to about 40 parts of a glycidyl polyether with about 100 parts of the amine, and that such adducts are also useful for providing solid cured glycidyl polyether products resistant to discoloration upon exposure to ultraviolet radiation. In most cases it is preferred to prepare such amine-epoxide adducts from the same glycidyl polyether used in the curable composition.

Accordingly, the invention provides in one aspect curable polyepoxide compositions comprising a glycidyl polyether and sufficient amounts of 1,4-bis (aminomethyl) cyclohexane to cure the composition to a solid, insoluble product.

In another aspect the invention provides curable polyepoxide compositions comprising a first glycidyl polyether and sufficient amounts of an adduct of from about 2 to about 40 parts by weight of a second glycidyl polyether with about 100 parts by weight of 1,4-bis (aminomethyl) cyclohexane to cure the composition to a solid insoluble product. Most preferably the first and second glycidyl polyethers are the same.

In still another aspect, the invention provides a method for improving the resistance to discoloration of cured glycidyl polyether products upon exposure to ultraviolet radiation by utilizing 1,4-bis (aminomethyl) cyclohexane or an adduct of 1,4-bis (aminomethyl) cyclohexane with a glycidyl polyether as the curing agent for producing such products.

In still another aspect, the invention provides a method for improving the resisatnce to moisture pickup of the solid cured glycidyl polyether products over an extended period of time.

In another aspect, the invention provides the solid cured products produced from the above compositions that are both UV stable and resistant to any appreciable moisture pickup.

The polyepoxides that can be used in the compositions and process of the invention are those glycidyl polyethers having more than one reactive epoxy group, that is more than one

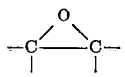

group. The epoxy groups may be terminal groups or they may be in an internal position in the polyepoxide molecule. Preferably, the epoxy groups are terminal. The polyepoxides may be saturated or unsaturated, aliphatic, cycloaliphatic, aromatic, or heterocyclic and may be substituted with other radicals such as hydroxyl groups, ether radicals and the like. The polyepoxides may be monomeric or polymeric.

As known in the art, many of the polyepoxides, and particularly those of the polymeric type are described in terms of epoxy equivalent weight. The term "epoxy equivalent weight" refers to the weight of the polyepoxide containing one equivalent of epoxy. The epoxy functionality of the polyepoxide is obtained by dividing the average molecular weight of the polyepoxide by the epoxy equivalent weight. These values can be determined by methods known to the art.

If the polyepoxide material is a single compound and all of the epoxy groups are intact, the epoxy functionality is an integer such as 2, 3, 4, et cetera. In the case of the polymeric-type polyepoxides the materials may contain some monomeric monoepoxides or have some of their epoxy groups hydrated or otherwise reacted and/or contain higher molecular weight molecules so that the epoxy functionality may be quite low and contain fractional values. The polymeric material may, for example, have an epoxy functionality such as 1.1, 1.5, 1.8, 2.5, 3.2 and the like.

Illustrative suitable glycidyl epoxy materials include, among others, 2,2-bis[4'(2'', 3''-epoxy propoxy) cyclohexyl] propane; 2,2-bis(4'[2''-chloromethyl-2''(2''',3'''-epoxypropoxy) ethoxy] cyclohexyl) propane; 1,4-bis (2,3-epoxypropoxy) benzene; 1,3-bis (2,3-epoxypropoxy) benzene; 4,4'-bis (2,3-epoxypropoxy) diphenyl ether; 1,8-bis (2,3-epoxypropoxy)-octane; and 1,4-bis(2,3-epoxypropoxy) cyclohexane.

The invention thus contemplates the glycidyl polyethers of polyhydric phenols obtained by reacting a polyhydric phenol with a stoichiometric excess of a halogen containing epoxide or dihalohydrin in an alkaline medium. Polyhydric phenols that can be used for this purpose include among others resorcinol, catechol, hydroquinone, methyl resorcinol; or polynuclear phenols such as 2,2-bis(4-hydroxyphenyl)-propane (Bisphenol A); 2,2-bis (4-hydroxy-cyclohexyl) propane (hydrogenated Bisphenol A); 2,2-bis (4-hydroxyphenyl)-butane; 4,4'-dihydroxybenzophenone; bis(4-hydroxyphenyl) ethane; 2,2-bis(4-hydroxyphenyl) pentane; and 1,5-dihydroxynaphthalene.

The diglycidyl ether of hydrogenated Bisphenol A is superior to similar acceptable resins for use in dental applications as is evidenced by its combination of excellent color stability against ultraviolet radiation and resistance to moisture pickup. Preparation of the diglycidyl ether of hydrogenated Bisphenol A proceeds as follows:

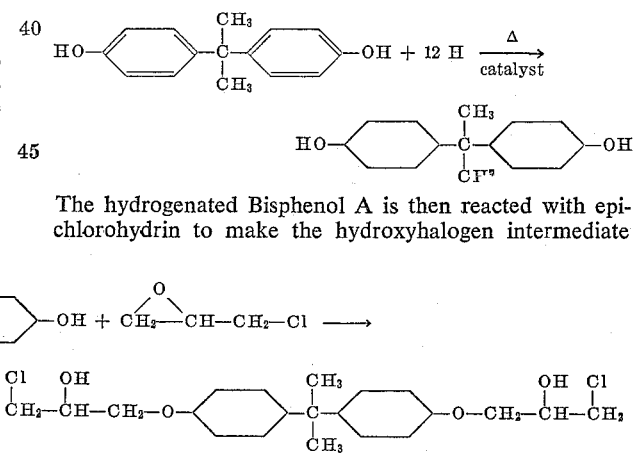

The hydrogenated Bisphenol A is then reacted with epichlorohydrin to make the hydroxyhalogen intermediate

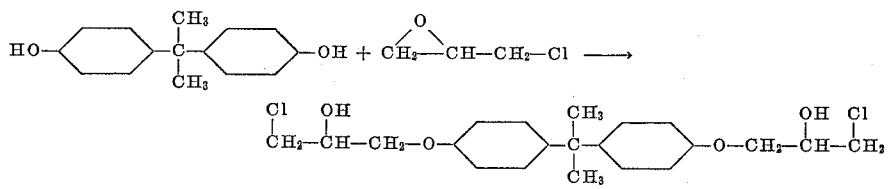

which can be dehydrohalogenated to yield the epoxy compound

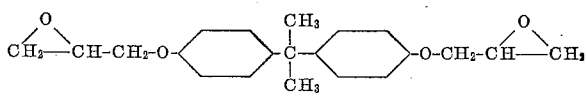

though other synthesis routes, such as preparation of the bis allyl ether of hydrogenated Bisphenol A and then expoxidation with a peroxide, avoid some other products formed when using the epichlorohydrin route.

Many other glycidyl polyethers, e.g., any of those described in the article by Lee and Neville appearing in the December 1960, issue of "Insulation" at pages 89 and 90, can also be used in the practice of the present invention. This article is incorporated herein by reference thereto.

The curing agent used in the practice of this invention has the formula:

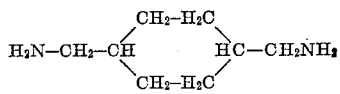

Adducts of this diamine with an epoxide have a greatly reduced tendency to absorb and react with carbon dioxide in the atmosphere and hence are preferably used as a source for the 1,4-bis(aminomethyl) cyclohexane curing agent used in the composition and process of this invention. Suitable adducts may be prepared by reacting from about 2 to about 40 parts by weight of polyepoxide with about 100 parts by weight of 1,4-bis(aminomethyl) cyclohexane. Weight ratios in these ranges provide adducts having terminal primary amino groups as well as internal seconary amino groups, each of which are active in the curing reaction.

The curable compositions of this invention comprise a glycidyl polyether and sufficient amounts of the curing agent to cure the composition to a solid insoluble product. Usually the curing agent will be used in stoichiometric amounts. For the purposes of determining stoichiometry each epoxy group is considered to react with one reactive hydrogen present in the amino groups of the curing agent. For example, when 1,4-bis(aminomethyl) cyclohexane is used as the curing agent the amounts thereof will usually be those sufficient to provide about 0.5 —$NH_2$ groups for each epoxide group in the polyepoxide. When adducts of the amine are used as the curing agent the amounts will usually be those sufficient to provide one active hydrogen atom (as hydrogens in —$NH_2$ groups or —NH groups) for each epoxide group in the polyepoxide. It will be understood that amounts above or below stoichiometric amounts may be used if desired. Thus, effective curing can be obtained using amounts ranging from about 60 percent to about 150 percent or more of the stoichiometric amount. The specific amount of curing agent in any particular situation will depend primarily upon the specific polyepoxide in the composition and the temperature used to effect the curing reaction.

Curing of the compositions of this invention may be effected over a wide range of temperatures. Many of the compositions are curable at room temperature, i.e., 20–23° centigrade, and the cure may be accomplished merely by mixing the polyepoxide and the amine (or amine-epoxide adduct) and permitting the admixture to stand at room temperature for a sufficient period of time to produce a cured product. In many applications it will be desirable to effect a more rapid cure and this may be accomplished by raising the temperature. Excellent cure rates are obtained at temperatures of from about 40 to about 100° centigrade and there are preferred for most of the applications where heating is desired.

In performing the process of the invention it is often desirable to have the polyepoxide in a mobile liquid condition when the epoxide and amine are admixed. With those polyepoxides that are liquid but too viscous for ready mixing one may either heat to reduce viscosity or use a liquid solvent to provide fluidity. Normally solid polyepoxides can either be melted or mixed with a liquid solvent. Various solvents are suitable for achieving the desired fluidity. They may be volatile solvents which escape from the polyepoxide composition by evaporation before or during the curing such as ketones like acetone, methyl ethyl ketone, methyl isobutyl ketone, et cetera, esters like methyl acetate, butyl acetate, Cellosolve acetate, methyl Cellosolve acetate, et cetera, or chlorinated hydrocarbons like trichloropropane, chloroform, et cetera. Solvents which remain in the cured composition may also be used such as diethyl phthalate, dibutyl phthalate or liquid monoepoxy compounds including glycidyl allyl ether, glycidyl phenyl ether, styrene oxide and the like. It is also often convenient to employ solid or semi-solid polyepoxides in combination with a liquid polyepoxide such as a normally liquid glycidyl polyether or a polyhydric aliphatic alcohol.

It is to be understood that various modifying ingredients such as pigments, filters, dyes, plasticizers and the like may be included in the curable compositions of this invention. While many such other ingredients will not be suitable when clear, transparent cured products are desired, the invention nevertheless imparts to such compositions resistance to discoloration when exposed to ultraviolet radiation.

The unmodified cured products produced according to the invention have excellent transparency. Many are crystal clear. All of the cured products, including the clear products, have excellent resistance to discoloration when exposed to ultraviolet radiation. Because of this highly desirable combination of properties, the cured products encompassed by the invention are useful in many applications (e.g., aircraft and missile glazing) in which previously known cured polyepoxide products were unsuitable. Further more, the additional improved moisture pickup resistance combined with the UV stability allows successful application of the solid cured epoxy resins as dental prosthetic devices.

The invention will be further illustrated by the following specific non-limiting examples. In the examples resistance to discoloration upon exposure to ultraviolet radiation was determined in accordance with ASTM test method 620–57T or its equivalent, American Dental Association Specification No. 12, ADA–12. This test utilizes a General Electric sunlamp containing an S1 bulb. Samples are exposed at a prescribed distance for 24 hours while rotating on a turntable. The distance between the sample and the bulb defines the intensity and temperature while the rotation of the sample serves to minimize the effects of hot spots or uneven radiation from the bulb. The S1 bulb contains a combination tungsten filament and mercury arc enclosed in a glass which has low transmission below 280 millimicrons. The radiation emanating from an S1 sunlamp bulb is essentially that of the live spectrum of mercury with a weak continum. In some of the examples a slightly modified test was used since the sunlamp specified in ASTM 620–57T is no longer commercially available. The S1 bulb and the exterior ballast for it is available but the polished reflector is not. This necessitated use of an enameled reflector and resulted in test equipment having a lower energy level. Calibration of the modified test instrument with an existing instrument showed that exposure for approximately 90 to 100 hours in the test instrument was equivalent to exposure for 24 hours in accordance with the ASTM 620 specification.

The moisture pickup test, ADA–12, calls for a specimen wafer size 2 inches in diameter and 0.020 inch thick. Wafers are placed in tap water at 37° centigrade and tested to equilibrium. The test is analogous to ASTMD 570, which calls for a specimen size of 2½ inches x 1 inch x ⅛ inch, but the smaller ADA specimen permits more rapid establishment of equilibrium.

In the examples all parts are parts by weight unless otherwise specified.

*Example 1*

In this example 10 parts of a commercially available water white diglycidyl ether of Bisphenol A having an epoxy equivalent weight of 180 was admixed with 2 parts of 1,4-bis(aminomethyl) cyclohexane at room temperature. After 30 minutes at room temperature the admixture had cured to produce a clear solid product. This product was postcured for an additional 30 minutes at 250° Fahrenheit. There was no color change. The postcured resin was then exposed to ultraviolet radiation using the ASTM 620–57T test method. After 24 hours of exposure there was no color shift. In contrast, cured polyepoxide products prepared with other known amine curing agents such as ethylenediamine, diethylenetriamine, triethylenetetramine, diethylaminopropylamine, hydroxypropylethylenediamine and metaxylylenediamine became markedly discolored when subjected to the same exposure test.

*Example 2*

In this example 20 parts of another commercially available diglycidyl ether of Bisphenol A (epoxy equivalent weight of 188) were reacted at room temperature with 80 parts of 1,4-bis(aminomethyl) cyclohexane to produce an amine-epoxide adduct which was used as the curing agent.

A curable composition was prepared by mixing 10 parts of the same polyepoxide used to prepare the adduct with 2 parts of the adduct. A solid, water white cured product was obtained from the admixture after 24 hours at room temperature.

The cured product was subjected to the ASTM 620–57T exposure test for 24 hours. The cured product remained transparent. Only a very faint yellowing could be observed.

*Example 3*

A commercially available diglycidyl ether of Bisphenol A having an epoxide equivalent weight of about 190 was molecularly distilled in order to eliminate any trace impurities which might cause color formation in the ultraviolet exposure test. The epoxide equivalent weight of the distilled resin was 178. Cured products were prepared from mixtures of about 10 parts of the distilled polyepoxide with 2 parts by weight of 1,4-bis(aminomethyl) cyclohexane. For purposes of comparison, a second cured product was prepared from the same polyepoxide resin substituting an equal amount of 1,4-diamino cyclohexane for the 1,4-bis(aminomethyl) cyclohexane used to prepare the first cured product.

Each of the cured products was then exposed for periods of time up to 6 days in the modified ASTM 620–57T test described hereinabove. In order to determine the resistance to discoloration after exposure to ultraviolet radiation, the percent transmission of light at 400 millimicrons and at 700 millimicrons for each of the cured products was measured before and at various times during the exposure.

The percent transmission of incident light at the various frequencies was determined from measurements with a double beam optical null-recording ultraviolet and visible spectrophotometer.

The results of this test are shown in the table below.

Cured products prepared from mixtures of the same polyepoxide and recrystallized methylene dianiline had much poorer transmission at all levels than either of the above products.

*Example 4*

In this example the polyepoxide employed wa sa diglycidyl ether of 1,4 endo methylene cyclohexanediol-2,6 having the formula:

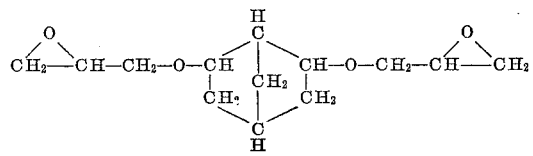

The diol also contained some 2,5-diol isomer. Separate cured products were prepared from 10 parts by weight of this polyepoxide and 2 parts by weight of, respectively, 1,4-bis(aminomethyl) cyclohexane and methane diamine. Each of the cured products was tested for resistance to discoloration upon exposure to ultraviolet light in the manner described in Example 3. Results are shown in Table III.

TABLE III

| Curing Agent | Days Exposed | Percent Transmission of Light Having Wavelength of— | |
|---|---|---|---|
| | | 400 Millimicrons | 700 Millimicrons |
| Menthane Diamine | 0 | 31 | 62 |
| | 2 | 38 | 68 |
| | 4 | 35 | 65 |
| | 6 | 36 | 64 |
| 1,4-Bis(aminomethyl) cyclohexane. | 0 | 61 | 83 |
| | 2 | 57 | 82 |
| | 4 | 58 | 83 |
| | 6 | 59 | 84 |

A cured product made from a mixture of the same epoxide and diethylenetriamine had much poorer transmission at all levels than the cured product of this invention and generally poorer transmission than the cured product made with menthane diamine.

*Example 5*

Procedure of Example 1 was followed with the exception that the epoxy resin used was 2,2-bis(4'[2''-chloromethyl-2''(2''', 3''' epoxypropoxy) ethoxy] cyclohexyl) propane; as follows:

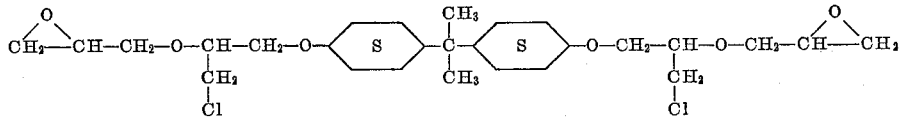

When cured with 1,4-bis (aminoethyl) cyclohexane, the resulting solid product was clear.

*Example 6*

In this example, 188 parts of 2,2-bis[4'-(2'', 3'' epoxypropoxy) cyclohexyl] propane (DGEHBA) was admixed with 35.5 parts 1,4-(aminomethyl) cyclohexane and 9.4 parts of a silica transparency extender and cured for 3 hours at 150° F. and 1 hour at 200° F. Using ADA–12 water pickup test, a 3.6% gain was observed. ADA–12 UV stability tests showed a 3.0% decrease in transmission at 350 millimicrons, 0.2% at 400 millimicrons and 0.5% at 700 millimicrons. This composition is representative of a dental crown and bridge resin.

TABLE II

| Curing Agent | Days Exposed to Radiation | Percent Transmission of Light Having Wavelength of— | |
|---|---|---|---|
| | | 400 Millimicrons | 700 Millimicrons |
| 1,4-Diamino Cyclohexane | 0 | 72 | 86 |
| | 2 | 40 | 69 |
| | 4 | 20 | 41 |
| | 6 | 19 | 41 |
| 1,4-Bis(aminomethyl) cyclohexane. | 0 | 68 | 71 |
| | 2 | 55 | 68 |
| | 4 | 51 | 67 |
| | 6 | 48 | 66 |

Example 7

One hundred eighty-eight parts of 2,2-bis[4'-(2", 3" epoxypropoxy) cyclohexyl] propane were admixed with 20.5 parts of diethylene triamine and cured as in Example 6. Under ADA 12 test specification, the sample showed a 9.1 percent pickup in moisture. The UV stability test showed a 9.5% transmission change at 350 millimicrons; 4.9% at 400 millimicrons and 1.3% at 700 millimicrons.

Example 8

In this example 283 parts of 2,2-bis(4'[2"-chloromethyl-2"(2"',3"' epoxypropoxy)ethoxy] cyclohexyl) propane were admixed with 35.5 parts of 1,4 (aminomethyl) cyclohexane and cured as in Example 6. ADA-12 water resistance and UV tests showed a 3.2% moisture pickup and 1.1% decrease in transmission at 350 millimicrons; 2.8% at 400 millimicrons; and 2.6% at 700 millimicrons. A comparison of results in Example 7 with those here indicate that the hydrogenated resin (DGEHBA) may be UV stable even with ordinary polyamines like diethylene triamine whereas the non-hydrogenated resin (DGEBA) is not. Moisture pickup is unsatisfactory for the DGEHBA, however, when the diethylene triamine curing agent is used. Thus for optimum results for epoxy resins for dental application, the 1,4-bis (aminomethyl) cyclohexane is the superior curing agent.

Example 9

An admixture of 188 parts of DGEHBA and 18.8 parts of a Lewis acid composition consisting of $SnCl_4 \cdot 5H_2O(3)$ and a propylene glycol (7) was cured at room temperature plus a 1 hour post cure at 200° F. ADA-12 water pickup resistance test showed a 7.3% gain. UV stability tests (ADA-12) showed a 3.9% transmission change at 350 millimicrons and 0.7% at 700 millimicrons.

Example 10

For this example, 188 parts of DGEHBA were admixed with 35.5 parts of 1,4-bis (aminomethyl) cyclohexane and cured under conditions of Example 6. Using ADA-12 test specifications, a 2.8% moisture pickup was determined and a 6.2% change at 350 millimicrons; 0.3% change at 400 millimicrons and 2% change at 700 millimicrons.

While both the diglycidyl ether of Bisphenol A and the diglycidyl ether of hydrogenated Bisphenol A have excellent UV stability when cured with the 1,4-bis (aminomethyl) cyclohexane curing agent, the hydrogenated resin appears to be the superior of the two and is thus preferred. Table IV as set forth below depicts this fact.

TABLE IV.—COMPARISON OF UV RESISTANCE OF DIGLYCIDYL ETHER OF BISPHENOL A (DGEBA) AND DIGLYCIDYL ETHER OF HYDROGENATED BISPHENOL A (DGEHBA) WHEN CURED WITH 1,4 BIS (AMINOMETHYL) CYCLO HEXANE

|  | Transmission at 350 millimicrons, percent | Transmission at 400 millimicrons, percent | Transmission at 700 millimicrons, percent |
|---|---|---|---|
| DGEBA: |  |  |  |
| Initial | 60.0 | 68.0 | 72.0 |
| After 96 hrs. S-1 | 28.0 | 50.0 | 68.0 |
| Change | 32.0 | 18.0 | 4.0 |
| DGEHBA: |  |  |  |
| Initial | 53.4 | 62.6 | 74.0 |
| After 96 hrs. S-1 | 47.2 | 62.3 | 72.0 |
| Change | 6.2 | 0.3 | 2.0 |

What is claimed is:

1. Curable composition comprising a glycidyl ether polyepoxide having an epoxy functionality greater than 1.0 and sufficient amounts of 1,4-bis(aminomethyl) cyclohexane to cure the composition to a solid, insoluble product.

2. Composition of claim 1 wherein said polyepoxide is a polyglycidyl ether of a polyhydric phenol.

3. The composition of claim 1 wherein the polyepoxide is a polyglycidyl ether of a hydrogenated polyhydric phenol.

4. Composition of claim 2 wherein said polyhydric phenol is 2,2-bis (4-hydroxyphenyl) propane.

5. Composition of claim 1 wherein said polyepoxide is a cycloaliphatic diglycidyl ether.

6. The composition of claim 3 wherein the polyepoxide is 2,2-bis [4'(2",3"-epoxypropoxy) cyclohexyl] propane.

7. The cured solid product of the composition of claim 6.

8. The composition of claim 1, wherein the polyepoxide is 2,2-bis (4'[2"-chloromethyl-2" (2"', 3"'-epoxypropoxy) ethoxy] cyclohexyl) propane.

9. The cured solid product of the composition of claim 8.

10. Cured solid product of the composition of claim 1.

11. Cured solid product of the composition of claim 4.

12. Cured solid product of the composition of claim 5.

13. Curable composition comprising a first glycidyl ether polyepoxide having an epoxy functionality greater than 1.0 and sufficient amounts of an adduct prepared from a mixture of 1,4-bis(aminomethyl) cyclohexane with from about 0.02 to about 0.4 part by weight of a second glycidyl ether polyepoxide per part of said 1,4-bis(aminomethyl) cyclohexane to cure the composition to a solid insoluble product.

14. Composition of claim 13 wherein said first and said second polyepoxides are the same.

15. Cured solid product of the composition of claim 13.

16. The composition of claim 13 wherein the polyepoxides are diglycidyl ethers of hydrogenated polyhydric phenols.

17. The composition of claim 13 wherein the polyepoxides are 2,2-bis[4'(2",3"-epoxypropoxy) cyclohexyl] propane.

18. The cured solid product of the composition of claim 16.

19. The cured solid product of the composition of claim 17.

20. The composition of claim 13 wherein the polyepoxides are chloromethylene ethers of diglycidyl ether of hydrogenated Bisphenol A.

21. The composition of claim 13 wherein the polyepoxides are 2,2 - bis(4'[2" - chloromethyl - 2"(2"',3"'-epoxypropoxy)ethoxy]cyclohexyl)propane.

22. The cured solid product of the composition of claim 21.

23. Process which comprises forming a mixture comprising a glycidyl ether polyepoxide having an epoxy functionality greater than 1.0 and sufficient amounts of 1,4-bis(aminomethyl) cyclohexane to cure the mixture, and then heating the mixture at temperatures and for times sufficient to cure the same to a solid insoluble product.

24. The process of claim 23 wherein the polyepoxide is a polyglycidyl ether of a hydrogenated polyhydric phenol.

25. The process of claim 23 wherein the polyepoxide is 2,2-bis[4'(2",3"-epoxypropoxy) cyclohexyl] propane.

26. Process of claim 23 wherein said polyepoxide is a polyglycidyl ether of a polyhydric phenol.

27. Process of claim 26 wherein said polyhydric phenol is 2,2-bis(4-hydroxyphenyl) propane.

28. Process which comprises forming a mixture of a first glycidyl ether polyepoxide having an epoxy functionality greater than 1.0 and sufficient amounts of an adduct prepared from a mixture of 1,4-bis (aminomethyl) cyclohexane with from about 0.02 to about 0.4 part by weight of a second glycidyl ether polyepoxide per part of said 1,4-bis (aminomethyl) cyclohexane to cure the composition to a solid insoluble product, and then heating the mixture at temperatures and for times sufficient to cure the same to a solid insoluble product.

29. Process of claim 28 wherein said first and said second polyepoxides are the same.

30. Process of claim 29 wherein said polyepoxide is a polyglycidyl ether of a polyhydric phenol.

31. Process of claim 30 wherein said polyhydric phenol is 2,2-bis(4-hydroxyphenyl)propane.

32. The process of claim 28 wherein both epoxides are 2,2-bis[4'(2",3"-epoxypropoxy)cyclohexyl]propane.

33. The process of claim 28 wherein both epoxides are 2,2 - bis(4'[2" - chloromethyl-2"(2''',3'''-epoxypropoxy) ethoxy]cyclohexyl)propane.

34. A dental prosthetic device having good color stability against ultraviolet radiation and good resistance to moisture pickup comprising a glycidyl ether polyepoxide having an epoxy functionality greater than 1.0 cured to a solid, insoluble product with sufficient amounts of 1,4-bis(aminomethyl)cyclohexane.

35. The dental prosthetic device of claim 34 wherein the polyepoxide is a diglycidyl ether of a polyhydric phenol.

36. The dental prosthetic device of claim 35 wherein the polyhydric phenol is 2,2-bis(4-cyclohexyl)propane.

37. The dental prosthetic device of claim 34 wherein the polyepoxide is 2,2-bis[4'(2",3"-epoxypropoxy)cyclohexyl]propane.

38. The dental prosthetic device of claim 34 wherein the polyepoxide is 2,2-bis(4'[2"-chloromethyl-2"(2''',3'''-epoxypropoxy)ethoxy]cyclohexyl propane.

No references cited.

MURRAY TILLMAN, *Primary Examiner.*

P. LIEBERMAN, *Assistant Examiner.*